US012646499B2

(12) United States Patent
Wang et al.

(10) Patent No.: US 12,646,499 B2
(45) Date of Patent: Jun. 2, 2026

(54) METHOD, DEVICE, AND COMPUTER PROGRAM PRODUCT FOR PROCESSING INFORMATION

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 285 days.

(21) Appl. No.: 18/112,084

(22) Filed: Feb. 21, 2023

(65) Prior Publication Data

US 2024/0242708 A1 Jul. 18, 2024

(30) Foreign Application Priority Data

Jan. 16, 2023 (CN) .......................... 202310075237.5

(51) Int. Cl.
*G10L 25/51* (2013.01)
*G06F 40/30* (2020.01)
(Continued)

(52) U.S. Cl.
CPC ........... *G10L 15/063* (2013.01); *G06N 3/045* (2023.01); *G10L 25/27* (2013.01); *G10L 25/51* (2013.01);
(Continued)

(58) Field of Classification Search
CPC .......... G06F 40/40; G06F 40/35; G06F 40/30; G10L 15/063; G10L 25/27; G06N 3/045
See application file for complete search history.

(56) References Cited

U.S. PATENT DOCUMENTS

| | | | | | |
|---|---|---|---|---|---|
| 10,827,064 | B2 * | 11/2020 | Segalis | ............. | H04M 3/42093 |
| 11,606,463 | B1 * | 3/2023 | Yeracaris | ............ | H04M 3/5232 |

(Continued)

FOREIGN PATENT DOCUMENTS

| | | | | | |
|---|---|---|---|---|---|
| CN | | 112084314 | A | * | 12/2020 | ......... G06F 16/3329 |

OTHER PUBLICATIONS

Su, Shang-Yu, and Yun-Nung Chen. "Investigating linguistic pattern ordering in hierarchical natural language generation." 2018 IEEE Spoken Language Technology Workshop (SLT). IEEE, 2018. (Year: 2018).*

(Continued)

*Primary Examiner* — Andrew C Flanders
*Assistant Examiner* — Theodore Withey
(74) *Attorney, Agent, or Firm* — Ryan, Mason & Lewis, LLP

(57) ABSTRACT

A method in an illustrative embodiment includes generating, based on a group of utterances in a dialog, multiple representations corresponding to the group of utterances, the multiple representations including a first representation associated with the group of utterances, a second representation associated with the group of utterances and a group of utterances following the group of utterances, and a third representation associated with the group of utterances and at least two groups of utterances in a context of the group of utterances. The method also includes obtaining, based on the multiple representations, multiple reference recognition results corresponding to the group of utterances, each of the multiple reference recognition results indicating whether the dialog needs to be transferred to a target object. The method further includes determining, based on the multiple reference recognition results, a target recognition result indicating whether the dialog needs to be transferred to the target object.

20 Claims, 5 Drawing Sheets

300

Generate, based on a group of utterances in a dialog, multiple representations corresponding to the group of utterances
— 302

Obtain, based on the multiple representations, multiple reference recognition results corresponding to the group of utterances
— 304

Determine, based on the multiple reference recognition results, a target recognition result indicating whether the dialog needs to be transferred to a target object
— 306

(51) Int. Cl.

| | |
|---|---|
| *G06F 40/35* | (2020.01) |
| *G06N 3/045* | (2023.01) |
| *G10L 15/06* | (2013.01) |
| *G10L 25/27* | (2013.01) |

(52) U.S. Cl.

CPC .............. *G06F 40/30* (2020.01); *G06F 40/35* (2020.01); *G10L 2015/0635* (2013.01)

(56) References Cited

U.S. PATENT DOCUMENTS

| | | | | |
|---|---|---|---|---|
| 12,266,355 | B2 * | 4/2025 | Hueser | G06F 40/30 |
| 2016/0104478 | A1 * | 4/2016 | Seo | G10L 15/08 |
| | | | | 704/244 |
| 2018/0240535 | A1 * | 8/2018 | Harper | G10L 25/66 |
| 2018/0278554 | A1 * | 9/2018 | Kassabgi | G16H 50/20 |
| 2020/0012721 | A1 * | 1/2020 | Pasupalak | G06F 40/295 |
| 2020/0401798 | A1 * | 12/2020 | Foncubierta Rodriguez | |
| | | | | G06F 16/51 |
| 2021/0136206 | A1 * | 5/2021 | Adibi | H04M 3/5175 |
| 2021/0174798 | A1 * | 6/2021 | Wu | G06N 3/045 |
| 2021/0314282 | A1 * | 10/2021 | Sharma | G06F 3/167 |
| 2022/0108689 | A1 * | 4/2022 | Tripathi | G10L 15/197 |
| 2022/0245776 | A1 * | 8/2022 | Vaezi Joze | G06T 5/50 |
| 2023/0021529 | A1 * | 1/2023 | Bhattacherjee | G06F 40/30 |
| 2023/0028944 | A1 * | 1/2023 | Chen | G06V 30/262 |
| 2023/0351126 | A1 * | 11/2023 | Park | H04M 1/65 |
| 2024/0078385 | A1 * | 3/2024 | Liang | G06F 40/211 |

OTHER PUBLICATIONS

S. M. Lundberg et al., "A Unified Approach to Interpreting Model Predictions," arXiv:1705.07874v2, Nov. 25, 2017, 10 pages.

J. Liu et al., "A Role-Selected Sharing Network for Joint Machine-Human Chatting Handoff and Service Satisfaction Analysis," arXiv:2109.08412v1, Sep. 17, 2021, 11 pages.

J. Devlin et al., "BERT: Pre-training of Deep Bidirectional Transformers for Language Understanding," arXiv:1810.04805v2, May 24, 2019, 16 pages.

* cited by examiner

200

300

400

500

METHOD, DEVICE, AND COMPUTER PROGRAM PRODUCT FOR PROCESSING INFORMATION

RELATED APPLICATION

The present application claims priority to Chinese Patent Application No. 202310075237.5, filed Jan. 16, 2023, and entitled "Method, Device, and Computer Program Product for Processing Information," which is incorporated by reference herein in its entirety.

FIELD

Embodiments of the present disclosure generally relate to the field of data processing, and in particular, to a method, a device, and a computer program product for processing information.

BACKGROUND

In the context of providing customer services to customers and other users, dialogs between users and service agents usually contain important information, such as problems from the users and solutions from the service agents. However, sometimes it takes a lot of time to understand a tedious and complex utterance.

With the development of computer technology, virtual worlds are now used to change customer services that users contact. For example, in avatar-based customer service systems, customers do not know who is talking to them. Ideally, customers may chat with an avatar without knowing what the person behind the generated avatar looks like, which greatly improves interactivity. In addition, a robot or other type of machine may also handle customer services as an avatar in an avatar-based customer service system. More and more robots are used in providing customer services because handling customer services through robots as avatars can release more labor. However, there are still many problems to be solved in the process of handling customer services by using robots as avatars.

SUMMARY

Embodiments of the present disclosure provide a method, a device, and a computer program product for processing information.

According to a first aspect of the present disclosure, a method for processing information is provided. The method includes generating, based on a group of utterances in a dialog, multiple representations corresponding to the group of utterances, the multiple representations including a first representation associated with the group of utterances, a second representation associated with the group of utterances and a group of utterances following the group of utterances, and a third representation associated with the group of utterances and at least two groups of utterances in a context of the group of utterances. The method also includes obtaining, based on the multiple representations, multiple reference recognition results corresponding to the group of utterances, each of the multiple reference recognition results indicating whether the dialog needs to be transferred to a target object. The method further includes determining, based on the multiple reference recognition results, a target recognition result indicating whether the dialog needs to be transferred to the target object.

According to a second aspect of the present disclosure, an electronic device is provided. The electronic device includes at least one processor; and a memory coupled to the at least one processor and having instructions stored thereon. The instructions, when executed by the at least one processor, cause the electronic device to execute actions including: generating, based on a group of utterances in a dialog, multiple representations corresponding to the group of utterances, the multiple representations comprising a first representation associated with the group of utterances, a second representation associated with the group of utterances and a group of utterances following the group of utterances, and a third representation associated with the group of utterances and at least two groups of utterances in a context of the group of utterances; obtaining, based on the multiple representations, multiple reference recognition results corresponding to the group of utterances, each of the multiple reference recognition results indicating whether the dialog needs to be transferred to a target object; and determining, based on the multiple reference recognition results, a target recognition result indicating whether the dialog needs to be transferred to the target object.

According to a third aspect of the present disclosure, a computer program product is provided. The computer program product is tangibly stored on a non-transitory computer-readable medium and includes machine-executable instructions. The machine-executable instructions, when executed by a machine, cause the machine to perform steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, wherein identical reference numerals generally represent identical components in the example embodiments of the present disclosure.

In the accompanying drawings, identical or corresponding numerals represent identical or corresponding parts.

DETAILED DESCRIPTION

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As described above, there are still many problems to be solved in the process of handling customer services by using robots as avatars. For example, when using a robot as a simple avatar, there may be a case where the robot customer service cannot handle problems from some users. In this case, if the problems from the users cannot be solved in time, user experience may be affected, and user demands cannot be met. The cost after returning to human customer service representing each avatar is quite high, and the advantage of using a robot as a customer service avatar is discarded, resulting in a waste of human resources.

In order at least to solve the above and other potential problems, an embodiment of the present disclosure provides a method for processing information. A computing device first generates, based on a group of utterances of each participant in a dialog, multiple representations corresponding to the group of utterances. The computing device then obtains, using the multiple representations, multiple reference recognition results corresponding to the group of utterances. Each of the multiple reference recognition results indicates whether the dialog needs to be transferred to a target object. The computing device finally determines, according to the multiple reference recognition results, a target recognition result indicating whether the dialog needs to be transferred to the target object, for example, whether the dialog needs to be transferred to human customer service. Through this method, it can be quickly and accurately determined whether a dialog needs to be transferred to a target object for processing, thereby improving the efficiency and accuracy of problem processing and improving user experience.

Figure 1:
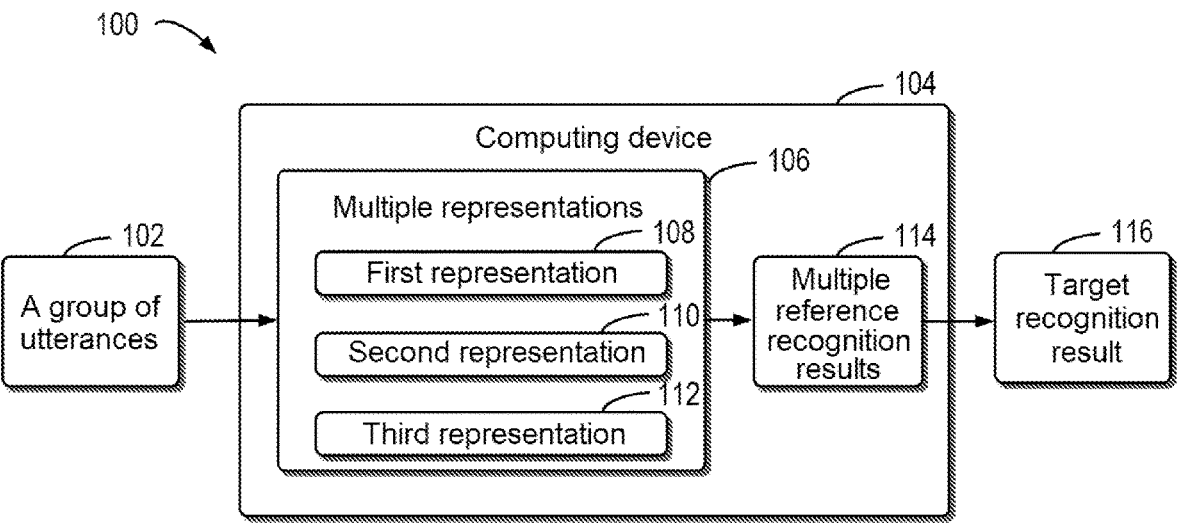
FIG. 1 illustrates a schematic diagram of an example environment in which a device and/or a method according to an embodiment of the present disclosure may be implemented.

Embodiments of the present disclosure will be further described in detail below with reference to the accompanying drawings. FIG. 1 shows an example environment in which a device and/or a method according to an embodiment of the present disclosure may be implemented.

As shown in FIG. 1, example environment 100 includes computing device 104. Computing device 104 may be configured to process a group of utterances 102 of each participant object in a dialog to obtain target recognition result 116. Target recognition result 116 is used to indicate whether to transfer the dialog to a target object. For example, when a user is chatting with a robot, it is determined, based on an utterance spoken by a chat object, whether the dialog is to be transferred next to human customer service for processing. For example, when a target recognition result indicates normal, the dialog does not need to be transferred.

When the target recognition result indicates transferable, the dialog is transferred to human customer service.

The group of utterances 102 is a continuous piece of utterance provided by a chat object during chatting, which may include one or more sentences. During chatting, each chat object may provide a group of utterances when asking or answering a question. Therefore, the chat may include multiple groups of utterances provided by different chat objects together.

Example computing device 104 includes, but is not limited to, a personal computer, a server computer, a handheld or laptop device, a mobile device, a multiprocessor system, a consumer electronic product, a minicomputer, a mainframe computer, a distributed computing environment including any of the above systems or devices, and the like.

After receiving a group of utterances 102, computing device 104 processes the utterances to obtain multiple representations 106. The multiple representations 106 include first representation 108, second representation 110, and third representation 112. First representation 108 is associated with the content of the group of utterances 102, for example, with each word in the group of utterances. Second representation 110 is associated with the group of utterances and a predicted group of utterances following the group of utterances in the dialog, for example, with semantics of the group of utterances and a predicted following group of reply utterances. Third representation 112 is associated with the group of utterances and at least two groups of utterances in a context of the group of utterances.

In some embodiments, the computing device acquires multiple representations 106 corresponding to the group of utterances 102 based on a predetermined mapping relationship between utterances and representations. In some embodiments, computing device 104 obtains multiple representations 106 by inputting the group of utterances 102 into a pre-trained coder. The above examples are only used for describing the present disclosure, and are not intended to specifically define the present disclosure.

Computing device 104 generates multiple reference recognition results 114 for the group of utterances 102 by using multiple representations 106. Each of the multiple reference recognition results 114 indicates whether the dialog needs to be transferred to a target object, for example, whether the dialog needs to be transferred to human customer service. In some embodiments, computing device 104 acquires multiple reference recognition results 114 corresponding to multiple representations 106 based on a predetermined mapping relationship between representations and recognition results. In some embodiments, computing device 104 obtains multiple reference recognition results 114 by inputting multiple representations 106 into a pre-trained decoder. The above examples are only used for describing the present disclosure, and are not intended to specifically define the present disclosure.

Computing device 104 determines final target recognition result 116 for the group of utterances based on the multiple reference recognition results, so as to determine whether the dialog needs to be transferred to the target object. For example, dialog D includes multiple groups of conversations $[u_1, \ldots, u_t, \ldots, u_L]$, where $u_1$, $u_t$, and $u_L$ each represent a group of conversations, t and L are positive integers, and $L > t$. The multiple groups of conversations can be processed to obtain their corresponding transfer labels $[y_1, \ldots, y_t, \ldots, y_L]$, where $y_t \in Y$, and Y is a set of transfer labels. The transfer label has two identifiers. One of the identifiers indicates normal, and the other identifier indicates transferable. The transferability indicates that the dialog should be transferred to human customer service, and the normality indicates that the dialog does not need to be transferred to human customer service. The above examples are only used for describing the present disclosure, and are not intended to specifically define the present disclosure.

It is shown in FIG. 1 that computing device 104 receives a group of utterances 102 from other devices, which is only an example and not a specific limitation to the present disclosure. In some embodiments, the group of utterances 102 is acquired from the dialog in computing device 104.

Through this method, it can be quickly and accurately determined whether a dialog needs to be transferred to a target object for processing, thereby improving the efficiency and accuracy of problem processing and improving user experience.

An example environment in which a device and/or a method according to an embodiment of the present disclosure may be implemented has been described above in conjunction with FIG. 1. A schematic flow chart of example process 200 of training and reasoning of a model for processing a dialog is described below in conjunction with FIG. 2. The flow chart in FIG. 2 may be performed on computing device 104 in FIG. 1 or any suitable computing device.

Figure 2:
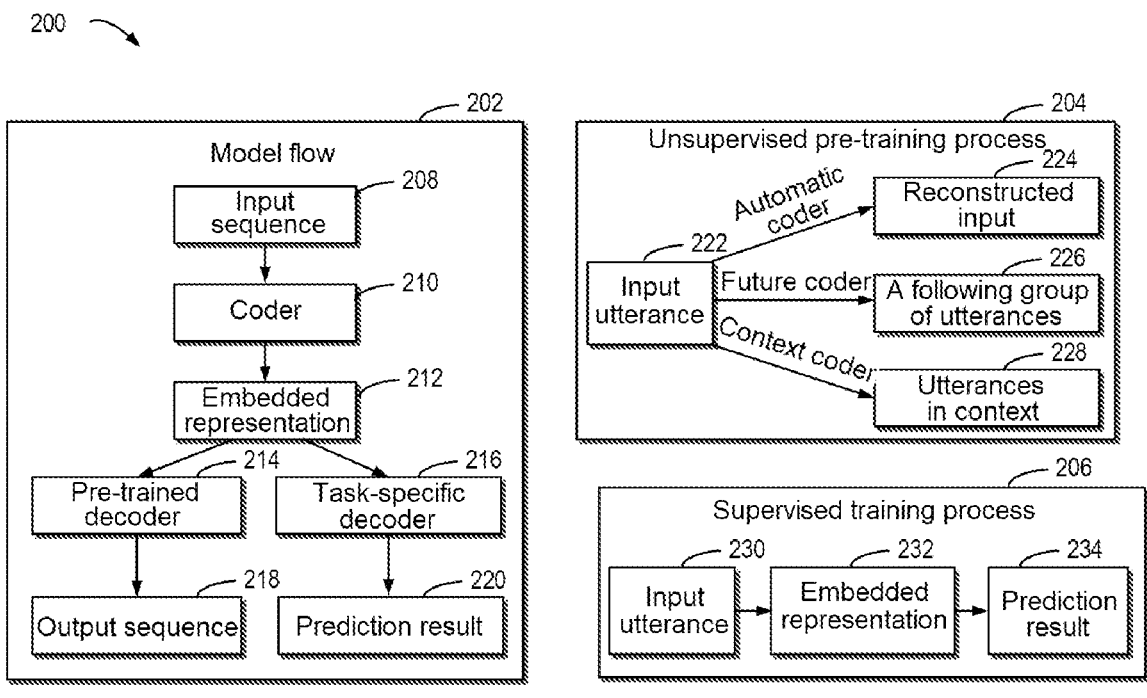
FIG. 2 illustrates a schematic flow chart of training and reasoning of a model for processing a dialog according to an embodiment of the present disclosure.

The training and reasoning processes of coders and decoders in a model for processing a dialog are described in model flow 202 in example process 200. In the first stage of training of the model, training of coder 210 is performed first. In one example, coder 210 may be a recurrent neural network (RNN) coder. In the stage of training coder 210, a coder-decoder (also referred to as sequence-to-sequence) model is pre-trained. As shown in FIG. 2, a left branch of the model flow is used for training. At this moment, input sequence 208, coder 210, embedded representation 212, pre-trained decoder 214, and output sequence 218 are adopted. For the coder-decoder model, a pair of token sequences (X, Y) is given, where $X=(x_1, \ldots, x_m)$ is referred to as input sequence 208, and $Y=(y_1, \ldots, y_n)$ is referred to as output sequence 218, which maximizes probability P (Y|X) that Y is obtained when the input is X. For each token sequence X or Y in the pair of token sequences (X, Y) corresponding to a group of utterances, $x_m$ and $y_n$ represent words in the group of utterances, and m and n are positive integers. The training process is unsupervised. First, coder 210 consumes input sequence 208 (X) to produce a hidden state h(X), also referred to as embedded representation 212, which is a dense vector representation of sequence X. Next, pre-trained decoder 214 obtains output sequence 218 (Y*) based on h(X), which is then compared with Y to train coder 210 and pre-trained decoder 214. In the present disclosure, three pairs of coder-decoders are trained by using three pre-training strategies to obtain three trained coders.

As shown in unsupervised pre-training process 204, three coders need to be trained, including an automatic coder, a future coder, and a context coder. For training of the automatic coder, the output sequence is identical to the input sequence. The automatic coder is trained by using a group of input utterances 222 in a sample dialog as sample inputs and using the group of input utterances 222 as sample outputs. Therefore, in the model training flow, the group of input utterances 222 are used as input sequence 208, and then pass through coder 210, embedded representation 212, pre-trained decoder 214, and output sequence 218 to obtain reconstructed input 224. Reconstructed input 224 is then compared with the group of input utterances 222 used as sample outputs to train the coder. The coder is more about the meaning of words in a group of utterances.

For the future coder, input sequence $X_t$ is given in order to force the coder to encapsulate the meaning of more rounds of dialogs, and output sequence Y is a group of utterances $X_{t+1}$ following $X_t$ in the dialog. This causes the coder to learn something about semantic intents of $X_t$, rather than only its lexical features, and to further predict reply $X_{t+1}$. For example, if $X_t$ contains a question, the coder should encapsulate the question to predict the answer of the next speaker. This will generate a stronger steering representation than the automatic coder does. In the training process, a group of input utterances 222 is used as sample inputs, then a predicted following group of utterances 226 is obtained and compared with a following group of input utterances in the sample dialog to train the future coder and the corresponding decoder.

When training the context coder, a group of input utterances in a sample dialog is given as input sequence $X_t$, and 2 k different sample input and sample output examples are created from multiple groups of conversations in the sample dialog: $(X_t, X_{t-k})$, $(X_t, X_{t-k+1})$, . . . $(X_t, X_{t-1})$, $(X_t, X_{t+1})$, . . . $(X_t, X_{t+k-1})$, $(X_t, X_{t+k})$, where k and t are positive integers. The context coder and the corresponding decoder are then trained by using the group of input utterances 222 as sample inputs and comparing obtained utterances 228 in the context as outputs with sample outputs $X_{t-k}$.

Three coder-decoders are trained in unsupervised pre-training process 204, followed by supervised training process 206. At this moment, embedded representation 232 is obtained from input utterance 230, and then prediction result 234 is obtained from the embedded representation. The process is mainly implemented by input sequence 208, coder 210, embedded representation 212, task-specific decoder 216, and prediction result 220 in the model flow. For a trained coder i, where i∈{a, f, c}, a represents the automatic coder, f represents the future coder, and c represents the context coder. A pre-trained coder is then used to obtain utterance embedding corresponding to the input utterance, and task-specific decoder 216 is then trained for all three coders, which includes a self-attention module and a fully connected layer. That is, the coders share one task-specific decoder. Only one common decoder is trained, thereby reducing the computational overhead in training. Alternatively, one task-specific decoder may also be trained for each coder, and thus three decoders may be trained, which will improve accuracy. For supervised training losses, cross-entropy may be used to perform this binary prediction task, e.g., predicting whether it is transferable or normal.

During the model reasoning, three corresponding prediction results 220 are obtained by using three pre-trained coders and task-specific decoders. The three corresponding prediction results are then processed to obtain a final prediction result.

Through this method, it can be quickly and accurately determined whether a dialog needs to be transferred to a target object for processing, thereby improving the efficiency and accuracy of problem processing and improving user experience.

Figure 3:
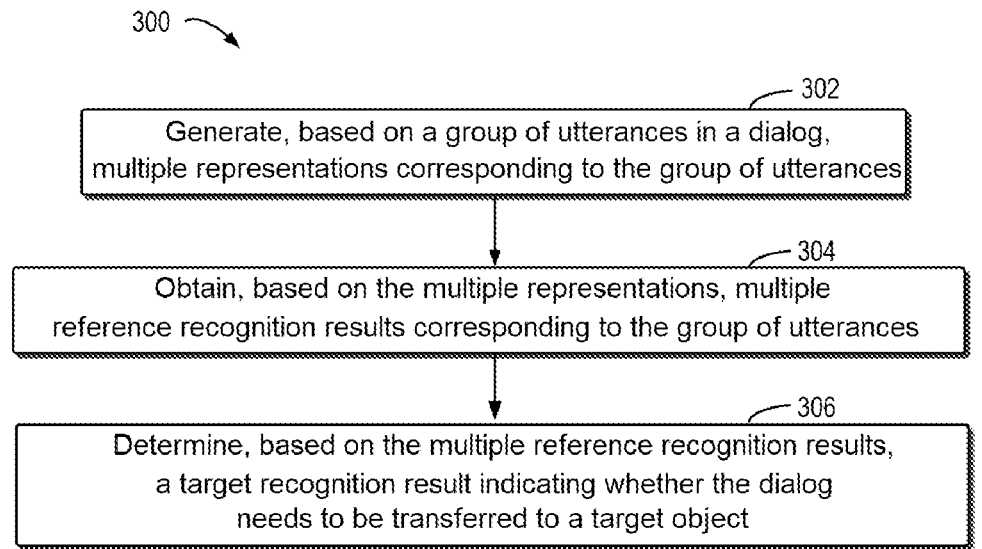
FIG. 3 illustrates a flow chart of a method for processing data according to an embodiment of the present disclosure.

A schematic flow chart of training and reasoning of a model for processing a dialog according to an embodiment of the present disclosure is described above in conjunction with FIG. 2. A flow chart of example method 300 for processing data according to an embodiment of the present disclosure is described below in conjunction with FIG. 3. The method in FIG. 3 may be performed on computing device 104 in FIG. 1 or any suitable computing device.

At block 302, based on a group of utterances in a dialog, multiple representations corresponding to the group of utterances are generated. The multiple representations include a first representation associated with the group of utterances. The multiple representations may also include a second representation associated with the group of utterances and a group of utterances following the group of utterances. Further, the multiple representations may also include a third representation associated with the group of utterances and at least two groups of utterances in a context of the group of utterances. For example, computing device 104 generates multiple representations 106 according to a group of utterances 102 in FIG. 1.

In some embodiments, computing device 104 inputs the group of utterances 102 into a first coder to obtain the first representation. The first coder is configured to extract, from the group of utterances, information associated with the group of utterances. Computing device 104 inputs the group of utterances into a second coder to obtain the second representation. The second coder is configured to extract, from the group of utterances, information associated with the group of utterances and a group of utterances following the group of utterances. Computing device 104 inputs the group of utterances into a third coder of the multiple coders to obtain the third representation. The third coder is configured to extract, from the group of utterances, information associated with the group of utterances and at least two groups of utterances in a context of the group of utterances. In some embodiments, the computing device obtains multiple representations corresponding to the group of utterances 102 based on a predetermined mapping relationship between utterances and representations. In this way, multiple pieces of representation information can be obtained quickly, so that more information about the group of utterances can be obtained.

In some embodiments, the first coder, the second coder, and the third coder are implemented by an RNN. The first coder, the second coder, and the third coder are pre-trained. When training the first coder, the second coder, and the third coder, the computing device uses sample utterances in a sample dialog to train the first coder, the second coder, and the third coder. The training process of the first coder, the second coder, and the third coder may be performed in computing device 104 or may be performed in other computing devices. During training, the computing device trains the first coder and a first decoder by using a group of sample utterances in the sample dialog as sample inputs and sample outputs. Computing device 104 also trains the second coder and a second decoder by using the group of sample utterances as sample inputs and using a group of sample utterances following the group of sample utterances in the dialog as sample outputs. Computing device 104 may also train the third coder and a third decoder by using the group of sample utterances as sample inputs and using at least two groups of sample utterances in a context of the group of sample utterances in the sample dialog as sample outputs. For example, the first coder is an automatic coder, the second coder is a future coder, and the third coder is a context coder. In this way, multiple coders for acquiring different information can be quickly trained.

At block 304, multiple reference recognition results corresponding to the group of utterances are obtained based on the multiple representations. Each of the acquired multiple reference recognition results indicates whether the dialog needs to be transferred to a target object. For example, computing device 104 obtains multiple reference recognition results 114 according to multiple representations 106.

In some embodiments, computing device 104 inputs, when obtaining the multiple reference recognition results, the multiple representations into a group of target decoders to obtain the multiple reference recognition results. The group of target decoders is a pre-trained machine model. In some embodiments, computing device 104 obtains the multiple reference recognition results corresponding to the multiple representations based on a predetermined mapping relationship between representations and recognition results. In this way, the reference recognition results can be obtained quickly and accurately. The above examples are only used for describing the present disclosure, and are not intended to specifically define the present disclosure.

In some embodiments, the group of target decoders is obtained by training. During training, the computing device inputs a group of sample utterances into the first coder to obtain a first sample representation, inputs a group of sample utterances into the second coder to obtain a second sample representation, and inputs a group of sample utterances into a third coder to obtain a third sample representation. The computing device then trains the group of target decoders based on the first sample representation, the second sample representation, the third sample representation, and a sample recognition result for the sample utterances.

In some embodiments, when the group of target decoders includes one target decoder, the computing device trains the target decoder by using each of the first sample representation, the second representation, and the third sample representation as a sample input and using the sample recognition result as a sample output.

In some embodiments, when the group of target decoders includes multiple target decoders, computing device 104 trains a first target decoder in the multiple target decoders by using the first sample representation as a sample input and using the sample recognition result as a sample output. Computing device 104 may also train a second target decoder in the multiple target decoders by using the second sample representation as a sample input and using the sample recognition result as a sample output. Computing device 104 may also train a third target decoder in the multiple target decoders by using the third sample representation as a sample input and using the sample recognition result as a sample output. In this way, the training of multiple target decoders can be quickly achieved.

At block 306, a target recognition result indicating whether the dialog needs to be transferred to the target object is determined based on the multiple reference recognition results. For example, computing device 104 obtains a target recognition result 116 according to the multiple reference recognition results 114.

In some embodiments, computing device 104 obtains a target recognition result by aggregating the multiple reference recognition results. Additionally, when aggregating the multiple reference recognition results to obtain a target recognition result, computing device 104 inputs the multiple reference recognition results into multiple decision trees in a random forest model. The target recognition result is then determined according to multiple results of the multiple decision trees. For example, the most likely result among the results obtained according to the multiple decision trees is used as the target recognition result. In some embodiments, the computing device may select the same reference recognition result with the largest number among the multiple reference recognition results as the target recognition result. The above examples are only used for describing the present disclosure, and are not intended to specifically define the present disclosure.

Through this method, it can be quickly and accurately determined whether a dialog needs to be transferred to a target object for processing, thereby improving the efficiency and accuracy of problem processing and improving user experience.

A flow chart of a method for processing data according to an embodiment of the present disclosure is described above in conjunction with FIG. 3. Example 400 of a model for generating recognition results according to an embodiment of the present disclosure is described below in conjunction with FIG. 4.

Figure 4:
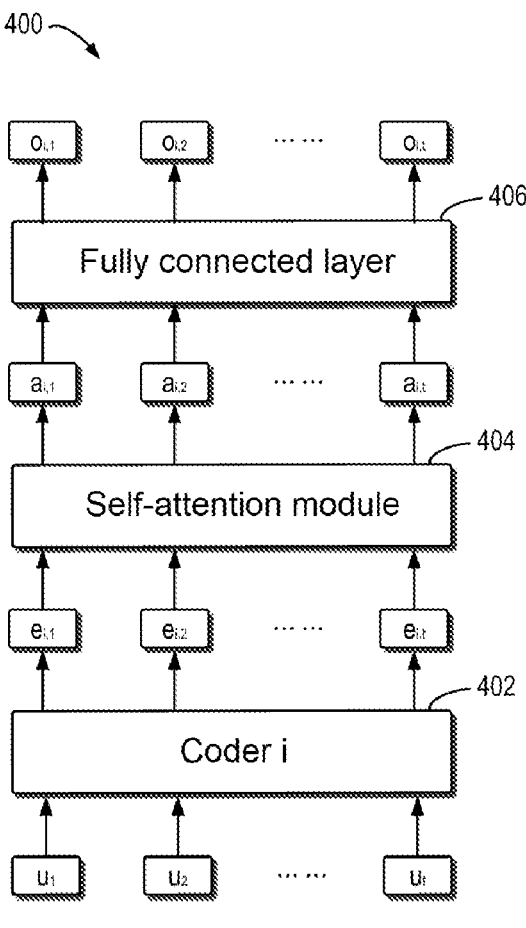
FIG. 4 illustrates a schematic diagram of an example of a model for generating a reference recognition result according to an embodiment of the present disclosure.

As shown in FIG. 4, when training a model for generating a reference recognition result or reasoning using the model for generating a reference recognition result, a group of utterances U is first acquired. The group of utterances includes a group of words $(u_i, u_2, \ldots, u_t)$, where t is a positive integer. The group of utterances U is then input to coder i 402, where $i \in \{a, f, c\}$, a represents the automatic coder, f represents the future coder, and c represents the context coder. The coded outputs $e_{i,1}, e_{i,2}, \ldots, e_{i,t}$ may be obtained after processing via coder i 402. The coded outputs are then input to self-attention module 404 to generate self-attention processed outputs $a_{i,1}, a_{i,2}, \ldots, a_{i,t}$, and then outputs $o_{i,1}, o_{i,2}, \ldots, o_{i,t}$ are obtained via fully connected layer 406, which may also be referred to as output $O_i$ corresponding to coder i. In the training process, the group of utterances U is used as inputs to the coder, and the obtained outputs are compared with the sample output as the recognition result to adjust the self-attention module and the fully connected layer for model pre-training.

Example 400 of a model for generating recognition results according to an embodiment of the present disclosure is described above in conjunction with FIG. 4. A schematic diagram for acquiring a target recognition result according to an embodiment of the present disclosure is described below in conjunction with FIG. 5.

Figure 5:
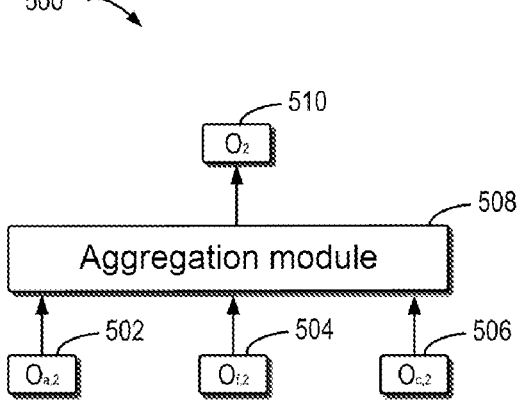
FIG. 5 illustrates a schematic diagram of acquiring a target recognition result according to an embodiment of the present disclosure.

For an aggregation operation of generating a target recognition result, the target recognition result may be obtained by using the following Equation (1):

$$O_i = AGG(O_{a,j}, O_{f,j}, O_{c,j}) \qquad (1)$$

where AGG( ) represents the used aggregation module, $O_{a,j}$ represents the output obtained by processing the jth group of utterances by the automatic coder and task-specific decoder, $O_{f,j}$ represents the output obtained by processing the jth group of utterances by the future coder and task-specific decoder, and $O_{c,j}$ represents the output obtained by processing the jth group of utterances by the context coder and task-specific decoder. The aggregation module may aggregate all inputs by using a method based on a random forest model. Alternatively, an attention method may be used to obtain an aggregation result. FIG. 5 shows an example 500 of aggregation for acquiring a target recognition result. For example, a second group of utterances in a dialog is processed by the model in FIG. 4 to obtain three reference recognition results, including first reference recognition result $O_{a,2}$ 502, second reference recognition result $O_{f,2}$ 504, and third reference recognition result $O_{c,2}$ 506, and the results are input into aggregation module 508 to obtain output $O_2$ 510 as a target recognition result.

Through this method, it can be quickly and accurately determined whether a dialog needs to be transferred to a target object for processing, thereby improving the efficiency and accuracy of problem processing and improving user experience.

Figure 6:
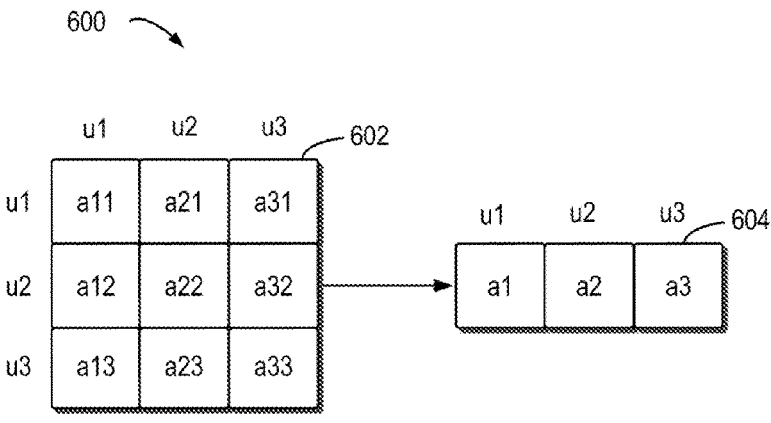
FIG. 6 illustrates a schematic diagram of acquiring an attention value according to an embodiment of the present disclosure.

To achieve the interpretability of target recognition results obtained from input utterances, a schematic diagram of example 600 for acquiring an attention value according to an embodiment of the present disclosure is described below in conjunction with FIG. 6. For the group of utterances described above, an attention value of each word in the group of utterances needs to be determined. The attention value indicates the degree of importance of a word when being used to acquire a target recognition result. When determining an attention value, the computing device first determines a vector representation of each word in the group of utterances. An attention matrix is then obtained by determining a correlation between every two words in the group of utterances according to the vector representation of each word, for example, by calculating an inner product of two vectors. As shown in FIG. 6, if the input sequence is composed of three words, attention matrix 602 may be obtained from the model, where $a_{ij}$ represents the corresponding attention value, and i, j are positive integers. Finally, an attention value of each word is determined based on the correlation or the attention matrix. These attentions are averaged to obtain a final attention value, for example, by the following Equation (2):

$$u1 = \text{mean}(a11 + a12 + a13) \qquad (2)$$

where mean( ) represents averaging, and a11, a12, and a13 represent the correlations of the first word with itself, with the second word, and with the third word. Through the above operations, an attention value of each word, for example, attention value set 604, is obtained.

Alternatively or additionally, to more clearly describe the interpretability of the input utterances to obtain the target recognition result, the computing device may also determine, according to the group of utterances and the target recognition result, a contribution value of each word in the group of utterances for obtaining the target recognition result. For example, it is processed by using a SHapley Additive exPlanations (SHAP) application programming interface. At this moment, after obtaining an SHAP value for each word, the values are added and then normalized. A threshold (0.8 in the present disclosure) is then used to select useful words. Through this method, it can be determined which words are important for obtaining the target recognition result.

A schematic diagram for acquiring an attention value according to an embodiment of the present disclosure is described above in conjunction with FIG. 6. A schematic diagram of dialog example 700 according to an embodiment of the present disclosure is described below in conjunction with FIG. 7.

Figure 7:
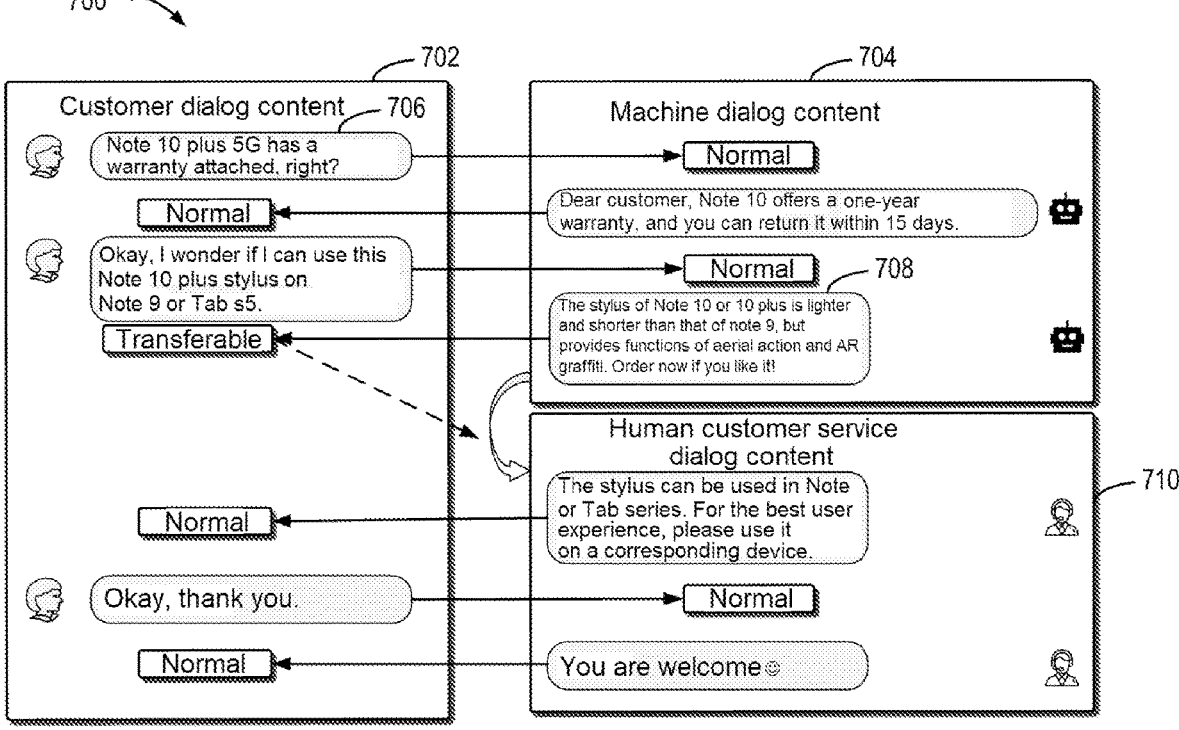
FIG. 7 illustrates a schematic diagram of a dialog example according to an embodiment of the present disclosure.

As shown in FIG. 7, dialog example 700 initially includes customer dialog content 702 and robot dialog content 704, the latter also referred to as machine dialog content 704, of a dialog between a customer and a robot. For each group of utterances spoken by each dialog object in the dialog contents, the computing device will determine its target recognition result. For example, during a dialog chat, it is determined, for a first group of utterances 706 in customer dialog content 702, that its target recognition result indicates normal. Then, a target recognition result is determined for each group of dialog contents in the following robot dialog contents and customer dialog contents. If the target recognition result indicates normal, the dialog is continued without being transferred. However, when the target recognition result of a group of utterances 708 in robot dialog content 704 indicates transferable, it is shown that the dialog needs to be transferred to human customer service for processing. At this moment, the dialog is transferred to the human customer service for processing, so as to obtain corresponding human customer service dialog content 710. Next, each group of dialogs is then processed.

Through this method, it can be quickly and accurately determined whether a dialog needs to be transferred to a target object for processing, thereby improving the efficiency and accuracy of problem processing and improving user experience.

Figure 8:
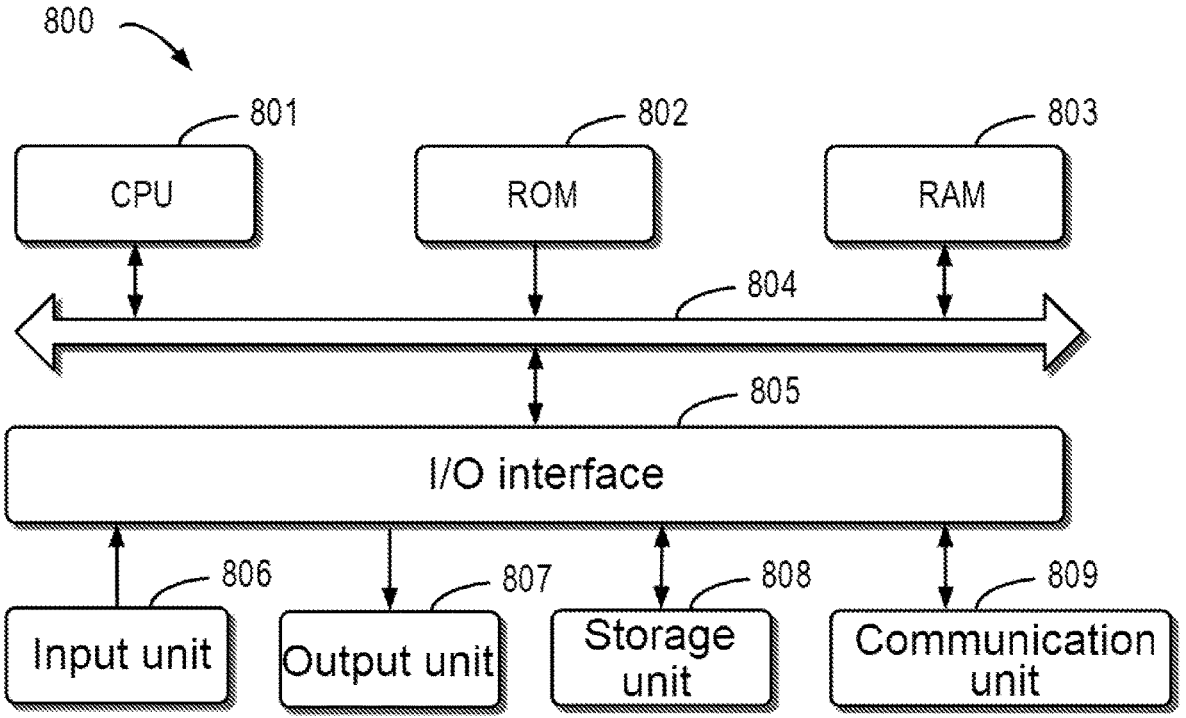
FIG. 8 illustrates a schematic block diagram of an example device suitable for implementing an embodiment of the present disclosure.

FIG. 8 shows a schematic block diagram of example device 800 that may be used to implement an embodiment of the present disclosure. Computing device 104 in FIG. 1 may be implemented using device 800. As shown in the figure, device 800 includes central processing unit (CPU) 801, which may execute various appropriate actions and processing according to computer program instructions stored in read-only memory (ROM) 802 or computer program instructions loaded from storage unit 808 onto random access memory (RAM) 803. Various programs and data required for the operation of device 800 may also be stored in RAM 803. CPU 801, ROM 802, and RAM 803 are connected to each other through bus 804. Input/output (I/O) interface 805 is also connected to bus 804.

Multiple components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various processes and processing described above, such as processes or methods 200 and 300, may be performed by CPU 801. For example, in some embodiments, processes or methods 200 and 300 may be implemented as a computer software program that is tangibly included in a machine-readable medium such as storage unit 808. In some embodiments, part or all of the computer program may be loaded and/or installed onto device 800 via ROM 802 and/or communication unit 809. When the computer program is loaded into RAM 803 and executed by CPU 801, one or more actions of processes or methods 200 and 300 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical coding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or multiple programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or multiple blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or multiple blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or multiple blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or multiple executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for processing information, comprising:
   generating, in a processor-based neural network of a machine learning system, based on a first group of utterances in a dialog, multiple representations corresponding to the first group of utterances, the multiple representations comprising a first representation generated by a first coder of the processor-based neural network and associated with the first group of utterances, a second representation generated by a second coder of the processor-based neural network and associated with the first group of utterances and a second group of utterances following the first group of utterances, and a third representation generated by a third coder of the processor-based neural network and associated with the first group of utterances and at least two additional groups of utterances in a context of the first group of utterances, wherein different subsets of the first, second and additional groups of utterances are applied as inputs to the first, second and third coders, respectively, and processed therein to generate the respective first, second and third representations;

obtaining, based on the multiple representations, multiple reference recognition results corresponding to the first group of utterances, each of the multiple reference recognition results indicating whether the dialog needs to be transferred to a target object, wherein the multiple reference recognition results are obtained by processing outputs of the respective first coder, second coder and third coder of the processor-based neural network in a first decoder, a second decoder and a third decoder, respectively, of the processor-based neural network, the first coder and the first decoder forming a first coder-decoder pair, the second coder and the second decoder forming a second coder-decoder pair, and the third coder and the third decoder forming a third coder-decoder pair, with each of the first, second and third decoders implementing a self-attention mechanism;

determining, based on the multiple reference recognition results, a target recognition result indicating whether the dialog needs to be transferred to the target object, at least in part by aggregation of respective outputs of the first, second and third decoders; and automatically controlling, in the machine learning system, transfer of the dialog from a robot-based avatar to the target object based on the target recognition result.

2. The method according to claim 1, wherein generating the multiple representations comprises:
   inputting the first group of utterances into the first coder to obtain the first representation, the first coder being configured to extract, from the first group of utterances, information associated with the first group of utterances;
   inputting the first group of utterances into the second coder to obtain the second representation, the second coder being configured to extract, from the first group of utterances, information associated with the first group of utterances and the second group of utterances following the first group of utterances; and
   inputting the first group of utterances into the third coder to obtain the third representation, the third coder being configured to extract, from the first group of utterances, information associated with the first group of utterances and the at least two additional groups of utterances in the context of the first group of utterances.

3. The method according to claim 2, further comprising:
   training the first coder and the first decoder by using a group of sample utterances in a sample dialog as sample inputs and sample outputs;
   training the second coder and the second decoder by using the group of sample utterances as sample inputs and using a group of sample utterances following the group of sample utterances in the dialog as sample outputs; and
   training the third coder and the third decoder by using the group of sample utterances as sample inputs and using at least two groups of sample utterances in a context of the group of sample utterances in the dialog as sample outputs.

4. The method according to claim 3, wherein obtaining the multiple reference recognition results comprises:

inputting the multiple representations into a group of target decoders to obtain the multiple reference recognition results.

5. The method according to claim 4, further comprising:

obtaining a first sample representation by inputting the group of sample utterances into the first coder;

obtaining a second sample representation by inputting the group of sample utterances into the second coder;

obtaining a third sample representation by inputting the group of sample utterances into the third coder; and training the group of target decoders based on the first sample representation, the second sample representation, the third sample representation, and a sample recognition result for the sample utterances.

6. The method according to claim 5, wherein the group of target decoders comprises a target decoder, and the method further comprises:

training the target decoder by using each of the first sample representation, the second representation, and the third sample representation as a sample input and using the sample recognition result as a sample output.

7. The method according to claim 5, wherein the group of target decoders comprises multiple target decoders, and the method further comprises:

training a first target decoder in the multiple target decoders by using the first sample representation as a sample input and using the sample recognition result as a sample output;

training a second target decoder in the multiple target decoders by using the second sample representation as a sample input and using the sample recognition result as a sample output; and training a third target decoder in the multiple target decoders by using the third sample representation as a sample input and using the sample recognition result as a sample output.

8. The method according to claim 1, wherein determining the target recognition result comprises:

obtaining the target recognition result by aggregating the multiple reference recognition results.

9. The method according to claim 8, wherein obtaining the target recognition result by aggregating the multiple reference recognition results comprises:

inputting the multiple reference recognition results into multiple decision trees in a random forest model; and determining the target recognition result based on multiple results of the multiple decision trees.

10. The method according to claim 1, further comprising:

determining, based on the first group of utterances, an attention value of each word in the first group of utterances, the attention value indicating the degree of importance of the word when being used to acquire the target recognition result.

11. The method according to claim 10, wherein determining the attention value comprises:

determining a vector representation of each word in the first group of utterances;

determining a correlation between two words in the first group of utterances based on the vector representation; and determining the attention value for each word based on the correlation.

12. The method according to claim 1, further comprising:

determining, based on the first group of utterances and the target recognition result, a contribution value of each word in the first group of utterances for obtaining the target recognition result.

13. An electronic device, comprising:

at least one processor; and memory coupled to the at least one processor and having instructions stored therein, wherein the instructions, when executed by the at least one processor, cause the electronic device to perform actions comprising:

generating, in a processor-based neural network of a machine learning system, based on a first group of utterances in a dialog, multiple representations corresponding to the first group of utterances, the multiple representations comprising a first representation generated by a first coder of the processor-based neural network and associated with the first group of utterances, a second representation generated by a second coder of the processor-based neural network and associated with the first group of utterances and a second group of utterances following the first group of utterances, and a third representation generated by a third coder of the processor-based neural network and associated with the first group of utterances and at least two additional groups of utterances in a context of the first group of utterances, wherein different subsets of the first, second and additional groups of utterances are applied as inputs to the first, second and third coders, respectively, and processed therein to generate the respective first, second and third representations;

obtaining, based on the multiple representations, multiple reference recognition results corresponding to the first group of utterances, each of the multiple reference recognition results indicating whether the dialog needs to be transferred to a target object, wherein the multiple reference recognition results are obtained by processing outputs of the respective first coder, second coder and third coder of the processor-based neural network in a first decoder, a second decoder and a third decoder, respectively, of the processor-based neural network, the first coder and the first decoder forming a first coder-decoder pair, the second coder and the second decoder forming a second coder-decoder pair, and the third coder and the third decoder forming a third coder-decoder pair, with each of the first, second and third decoders implementing a self-attention mechanism;

determining, based on the multiple reference recognition results, a target recognition result indicating whether the dialog needs to be transferred to the target object, at least in part by aggregation of respective outputs of the first, second and third decoders; and automatically controlling, in the machine learning system, transfer of the dialog from a robot-based avatar to the target object based on the target recognition result.

14. The electronic device according to claim 13, wherein generating the multiple representations comprises:

inputting the first group of utterances into the first coder to obtain the first representation, the first coder being configured to extract, from the first group of utterances, information associated with the first group of utterances;

inputting the first group of utterances into the second coder to obtain the second representation, the second coder being configured to extract, from the first group of utterances, information associated with the first group of utterances and the second group of utterances following the first group of utterances; and inputting the first group of utterances into the third coder to obtain the third representation, the third coder being configured to extract, from the first group of utterances, information associated with the first group of utterances and the at least two additional groups of utterances in the context of the first group of utterances.

15. The electronic device according to claim 14, wherein the actions further comprise:

training the first coder and the first decoder by using a group of sample utterances in a sample dialog as sample inputs and sample outputs;

training the second coder and the second decoder by using the group of sample utterances as sample inputs and using a group of sample utterances following the group of sample utterances in the dialog as sample outputs; and training the third coder and the third decoder by using the group of sample utterances as sample inputs and using at least two groups of sample utterances in a context of the group of sample utterances in the dialog as sample outputs.

16. The electronic device according to claim 15, wherein obtaining the multiple reference recognition results comprises:

inputting the multiple representations into a group of target decoders to obtain the multiple reference recognition results.

17. The electronic device according to claim 16, wherein the actions further comprise:

obtaining a first sample representation by inputting the group of sample utterances into the first coder;

obtaining a second sample representation by inputting the group of sample utterances into the second coder;

obtaining a third sample representation by inputting the group of sample utterances into the third coder; and training the group of target decoders based on the first sample representation, the second sample representation, the third sample representation, and a sample recognition result for the sample utterances.

18. The electronic device according to claim 17, wherein the group of target decoders comprises a target decoder, and the actions further comprise:

training the target decoder by using each of the first sample representation, the second representation, and the third sample representation as a sample input and using the sample recognition result as a sample output.

19. The electronic device according to claim 17, wherein the group of target decoders comprises multiple target decoders, and the actions further comprise:

training a first target decoder in the multiple target decoders by using the first sample representation as a sample input and using the sample recognition result as a sample output;

training a second target decoder in the multiple target decoders by using the second sample representation as a sample input and using the sample recognition result as a sample output; and training a third target decoder in the multiple target decoders by using the third sample representation as a sample input and using the sample recognition result as a sample output.

20. A computer program product comprising a non-transitory computer-readable medium having machine-executable instructions stored therein, wherein the machine-executable instructions, when executed by a machine, cause the machine to perform actions comprising:

generating, in a processor-based neural network of a machine learning system, based on a first group of utterances in a dialog, multiple representations corresponding to the first group of utterances, the multiple representations comprising a first representation generated by a first coder of the processor-based neural network and associated with the first group of utterances, a second representation generated by a second coder of the processor-based neural network and associated with the first group of utterances and a second group of utterances following the first group of utterances, and a third representation generated by a third coder of the processor-based neural network and associated with the first group of utterances and at least two additional groups of utterances in a context of the first group of utterances, wherein different subsets of the first, second and additional groups of utterances are applied as inputs to the first, second and third coders, respectively, and processed therein to generate the respective first, second and third representations;

obtaining, based on the multiple representations, multiple reference recognition results corresponding to the first group of utterances, each of the multiple reference recognition results indicating whether the dialog needs to be transferred to a target object, wherein the multiple reference recognition results are obtained by processing outputs of the respective first coder, second coder and third coder of the processor-based neural network in a first decoder, a second decoder and a third decoder, respectively, of the processor-based neural network, the first coder and the first decoder forming a first coder-decoder pair, the second coder and the second decoder forming a second coder-decoder pair, and the third coder and the third decoder forming a third coder-decoder pair, with each of the first, second and third decoders implementing a self-attention mechanism;

determining, based on the multiple reference recognition results, a target recognition result indicating whether the dialog needs to be transferred to the target object, at least in part by aggregation of respective outputs of the first, second and third decoders; and automatically controlling, in the machine learning system, transfer of the dialog from a robot-based avatar to the target object based on the target recognition result.

* * * * *